United States Patent [19]

Takizawa

[11] Patent Number: 4,800,455
[45] Date of Patent: Jan. 24, 1989

[54] MAGNETIC DISK DRIVE HAVING A MAGNETIC-HEAD WITH A HEAD GAP SUPPORTED PARALLEL TO THE MOVING DIRECTION OF A MAGNETIC-HEAD POSITIONING MECHANISM

[75] Inventor: Toshimitsu Takizawa, Tachikawa, Japan

[73] Assignee: Kabushiki Kaisha Toshiba, Kanagawa, Japan

[21] Appl. No.: 860,039

[22] Filed: May 6, 1986

[30] Foreign Application Priority Data

May 7, 1985 [JP] Japan .................................. 60-95576

[51] Int. Cl.⁴ .......................... G11B 5/48; G11B 5/23
[52] U.S. Cl. .................................. 360/104; 360/106; 360/119
[58] Field of Search ............... 360/102, 103, 104, 106, 360/107, 122, 129, 119, 97, 99, 77

[56] References Cited

U.S. PATENT DOCUMENTS

| | | | |
|---|---|---|---|
| 3,057,970 | 10/1962 | Brunner | 360/102 |
| 3,772,666 | 11/1973 | Scholz et al. | 360/98 |
| 4,130,847 | 12/1978 | Head et al. | 360/103 X |
| 4,334,252 | 6/1982 | Tosiu | 360/103 X |

FOREIGN PATENT DOCUMENTS 0089880  5/1985  Japan .................................. 360/104

Primary Examiner—Robert S. Tupper
Assistant Examiner—Andrew L. Sniezek
Attorney, Agent, or Firm—Finnegan, Henderson, Farabow, Garrett, & Dunner

[57] ABSTRACT

In a magnetic disk drive having a linear-moving type magnetic-head positioning mechanism, a head gap is formed to be parallel to a moving direction of the magnetic-head positioning mechanism, and a magnetic head is mounted on the magnetic-head positioning mechanism through a suspension, so that the longitudinal direction of the magnetic head is perpendicular to the radial direction of a magnetic disk when it is at the inner periphery of the magnetic disk.

2 Claims, 4 Drawing Sheets

MAGNETIC DISK DRIVE HAVING A MAGNETIC-HEAD WITH A HEAD GAP SUPPORTED PARALLEL TO THE MOVING DIRECTION OF A MAGNETIC-HEAD POSITIONING MECHANISM

The present application claims priority of Japanese Patent Application Serial No. 60-95576 filed on May 7th, 1985.

TECHNICAL FIELD OF THE INVENTION

The present invention relates to a magnetic disk drive having a linear-moving type magnetic-head positioning mechanism.

BACKGROUND OF THE INVENTION AND ITS PROBLEMS

In recent years, magnetic disk drive have become compact and light in weight, with a large storage capacity. In order to respond to this tendency, a large number of magnetic disks (to be referred to as unit disks hereinafter) and a magnetic head must be efficiently arranged within a limited space. A conventional magnetic head normally comprises a floating type magnetic head/slider assembly comprises a slider (acting as a fluid bearing), a core, and a gap, and the assembly is supported by a suspension.

In an arrangement of such a magnetic head/slider assembly, as shown in the plan and side views of FIGS. 3 and 4, magnetic head/slider assemblies 3a and 3b, respectively supported by suspensions 2a and 2b, are vertically alinged between two opposing unit disks 1a and 1b. With this arrangement, the distance between a recording surface of the unit disk 1a or 1b and a mounting surface of the suspension 2a or 2b must be normally about 2.54 mm. Therefore, with the above vertical alignment, the distance between the unit disks 1a and 1b must be at least 5.08 mm.

In order to reduce this distance between the unit disks, when magnetic head/slider assemblies 3a and 3b, respectively supported by suspensions 2a and 2b, are alinged parallel to each other, as shown in the plan and side views of FIGS. 5 and 6, the distance between unit disks 1a and 1b can be reduced to 2.54 mm+$\alpha$mm ($\alpha \div 0.5$).

However, this structure poses the following problem. With the parallel arrangement of the magnetic head/slider assemblies 3a and 3b shown in FIG. 5, however, a so-called yaw angle $\theta y$ is formed between a longitudinal direction X of the magnetic head/slider assembly 3 and the tangential direction Dt of the unit disk, as shown in FIG. 7. An increase in the yaw angle $\theta y$ causes a floating amount of the magnetic head/slider assembly 3 to decrease. When a magnetic disk drive having a linear carriage is used, this tendency is enhanced as the magnetic head/slider assembly 3 moves toward the inner periphery of the unit disk 1. At the inner periphery of the disk 1, since a speed of the unit disk 1 relative to the magnetic head/slider assembly 3, i.e., a peripheral speed, is decreased, the floating amount thereof is further reduced. Therefore, the magnetic head/slider assembly 3 is easily brought into contact with the unit disk 1, resulting in so-called headcrash.

In order to solve this problem, as shown in the plan view of FIG. 8, the central axes y of the suspensions 2a and 2b, respectively supporting the magnetic head/slider assemblies 3a and 3b, are inclined with respect to a moving direction C of the assembly 3, so that as shown in FIG. 9, the longitudinal direction X of the assembly 3 coincides with a tangential direction Dt1 of the unit disk 1 at the inner periphery where the peripheral speed is low. With this structure, the yaw angle $\theta y$ is reduced to zero at the inner periphery, while the longitudinal direction X of the assembly 3 does not coincide with a trangential direction Dt2 of the unit disk 1 to form the yaw angle $\theta y$ therebetween at the outer periphery, where the peripheral speed is high. Therefore, a total variation in the floating amount of the assembly 3 on the entire unit disk 1 can be maintained uniform.

Note that in FIG. 9, Dr1 and Dr2 indicate radial directions of the unit disk 1, which extend through a head gap 5 when the magnetic head/slider assembly 3 is at the inner and outer peripheries of the unit disk 1, respectively.

However, in the conventional magnetic head/slider assembly 3, the head gap 5 is formed in a direction Y perpendicular to the longitudinal direction X of the assembly 3, as shown in FIG. 7. With the arrangement of the magnetic head in FIG. 8, when the magnetic head/slider assembly 3 is mounted on a linear carriage (not shown) to periodically record a signal on the unit disk 1, bit patterns 6 on adjacent tracks are discontinuous, as shown in the plan view of FIG. 9. This creates another problem due to phase shift in waveforms when data on the adjacent tracks is scanned as servo data.

OBJECT AND SUMMARY OF THE INVENTION

The present invention has been made in consideration of the above situation, and has as its object to provide a compact, large-capacity magnetic recording drive in which a variation in floating amount of a magnetic head/slider assembly is eliminated, and good continuous bit patterns can be obtained.

In order to achieve the above object of the present invention, a magnetic head/slider assembly, in a magnetic disk drive having a linear-moving type magnetic head positioning mechanism, is mounted on the positioning mechanism through a suspension, so that a longitudinal direction thereof coincides with a tangential direction of a magnetic disk when the assembly is at the inner periphery of the magnetic disk, and a head gap of the assembly is formed parallel to a moving direction of the positioning mechanism.

EMBODIMENT OF THE INVENTION

A magnetic disk drive according to an embodiment of the present invention will be described with reference to the accompanying drawings.

Figure 1:
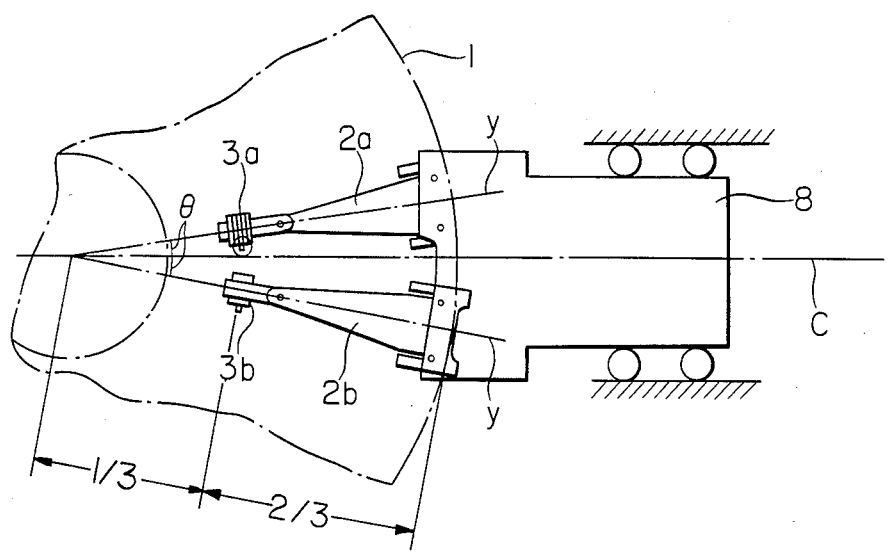
FIG. 1 is a plan view of a magnetic recording head of a magnetic disk drive according to an embodiment of the present invention.
Figure 2:
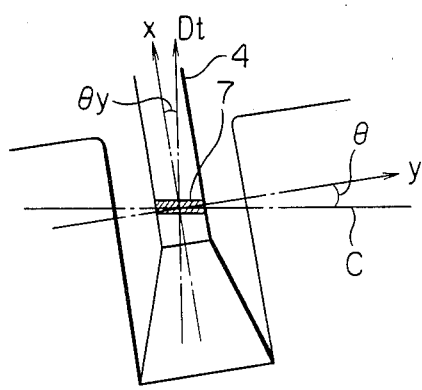
FIG. 2 is a partially enlarged view of a main part of FIG. 1.
Figure 3:
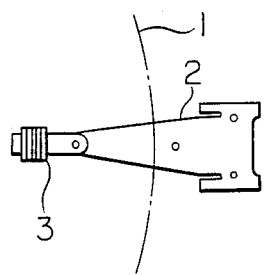
FIGS. 3, 5, and 8 and FIGS. 4 and 6 are, respectively, plan views and side views of a conventional magnetic recording head.
Figure 4:
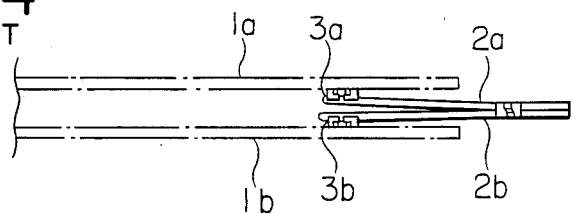
Figure 5:
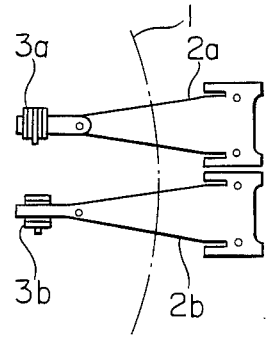
Figure 6:
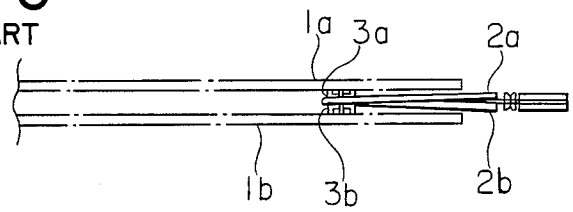
Figure 7:
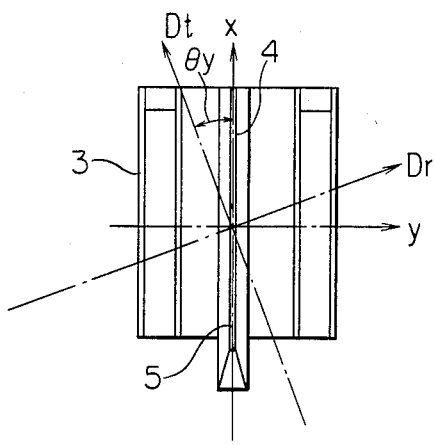
FIG. 7 is a plan view of a conventional floating head.

FIGS. 1 and 2 are a plan view and a partially enlarged view of the embodiment of the present invention.

The same reference numerals in FIGS. 1 and 2 denote the same parts as in the prior art shown in FIGS. 3 to 9.

Figure 8:
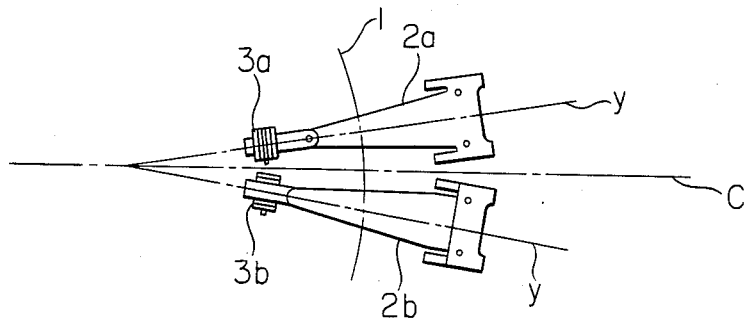
Figure 9:
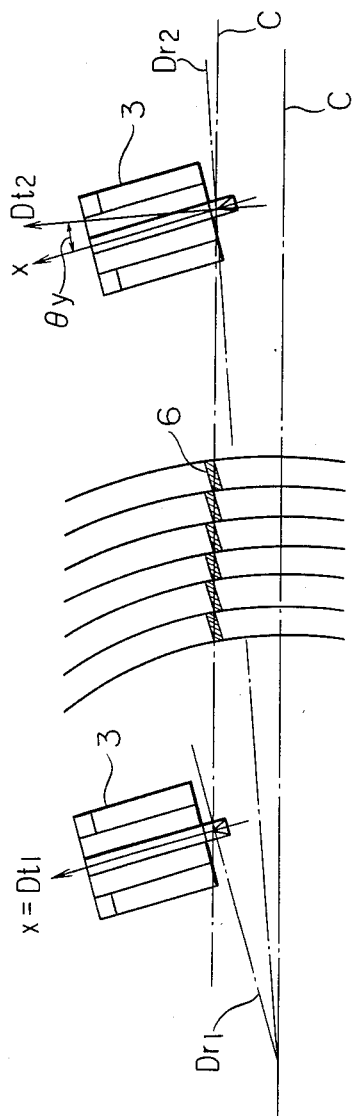
FIG. 9 is a plan view showing an operation of the head shown in FIG. 7.

Referring to FIGS. 1 and 2, a pair of magnetic head/slider assemblies 3a and 3b, each having a slider 4 (acting as a fluid bearing), a gap 7, and a core (not shown), are supported by suspensions 2a and 2b, respectively, as in the prior art shown in FIG. 8. The suspensions 2a and 2b are mounted on a linear-moving type head positioning mechanism 8. The magnetic head/slider assemblies 3a and 3b are sandwiched between two opposing unit disks 1a and 1b, as in the prior art shown in FIG. 6, so that the sliders 4 face the corresponding unit-disk surfaces. The suspensions 2a and 2b are arranged on a substantially identical plane. The suspensions 2a and 2b are mounted on the positioning mechanism 8 so that when the magnetic head/slider assemblies 3a and 3b mounted on the distal ends thereof are distant from the center of the unit disk by ⅓ its radius, a central axis y of each of the suspensions 2a and 2b coincides $\theta$ with a radial direction Dr of the corresponding unit disk 1a or 1b, and forms an angle $\theta$ with respect to a moving direction C of the mechanism 8. Each magnetic head/slider assembly 3 is fixed to its corresponding suspension 2 so that the X axis of the assembly 3 is perpendicular to the central axis y of the suspension 2. A head gap 7, having the same azimuth angle as a mounting angle $\theta$ of each suspension 2, is formed in the magnetic head/slider assembly 3.

The operation of this embodiment will now be described.

As shown in FIG. 1, the magnetic head/slider assemblies 3a and 3b are moved linearly along the moving direction C of the positioning mechanism 8. In the assemblies 3a and 3b, a yaw angle $\theta y$ between the X axis of the assembly 3 and a tangential direction Dt of the unit disk 1 shown in FIG. 2 (the encircled portion of FIG. 1) is decreased to zero at the inner periphery of the unit disk 1, and is increased from zero at the outer periphery thereof. Even though the peripheral speed of the unit disk 1 with respect to the magnetic head/slider assembly 3 is increased toward the outer periphery, the floating amount of the assembly 3 at the inner periphery is substantially equal to that at the outer periphery. Since the head gap 7 has the same azimuth angle as the mounting angle $\theta$ of the suspension 2 and is therefore parallel to the moving direction C of the positioning mechanism 8, discontinuous bit patterns 6 recorded on the unit disk 1 shown in FIG. 9 will not be formed.

The arrangement of this embodiment described above can realize a compact, large-capacity magnetic disk drive which records/reproduces servo data, and in which a distance between unit disks is reduced, a variation in floating amount of a magnetic head/slider assembly can be minimized, and adjacent recorded bit patterns 6 will not be discontinuous.

According to the present invention as described above, the yaw angle of a magnetic head/slider assembly is decreased to zero at the inner periphery of a unit disk and is increased at the outer periphery thereof, and a head gap has the same azimuth angle as a mounting angle of the suspension. Therefore, a variation in floating amount of the assembly can be reduced, and good bit patterns can be obtained, thus realizing a compact, large-capacity magnetic disk drive.

I claim:

1. A magnetic disk drive apparatus for aligning a magnetic head relative to a plurality of concentric annular tracks formed on a recording surface of a magnetic disk, said magnetic disk having a predetermined radius, comprising:

a magnetic head disposed on the distal end of a suspension arm having a longitudinal axis;

linear positioning means for moving said suspendion arm and magnetic head across said recording surfaces along a first axis parallel to said recording surface and coincident with the center of said disk, said suspension arm being fixedly connected to and extending from said positioning means such that said longitudinal axes of said suspension arm forms a first angle relative to said first axis;

said magnetic head having a slider section, said slider section having a surface disposed opposite to said recording surface and acting as a fluid bearing against said recording surface, and a head gap formed in said surface of said slider section;

said head gap being inclined relative to said longitudinal axis of said suspension arm and parallel to said first axis along which said linear positioning means moves such that bit patterns recorded on adjacent tracks by said head gap are linearly continuous from the innermost tract to the outermost track of said magnetic disk.

2. The apparatus of claim 1, wherein said longitudinal axis of said suspension arm is inclined relative to said first axis of said positioning means such that said longitudinal axis of said suspension arm is coincident with the center of said disk when said magnetic head is positioned one-third of said predetermined radius of said disk from the disk center.

* * * * *